Figure 1:
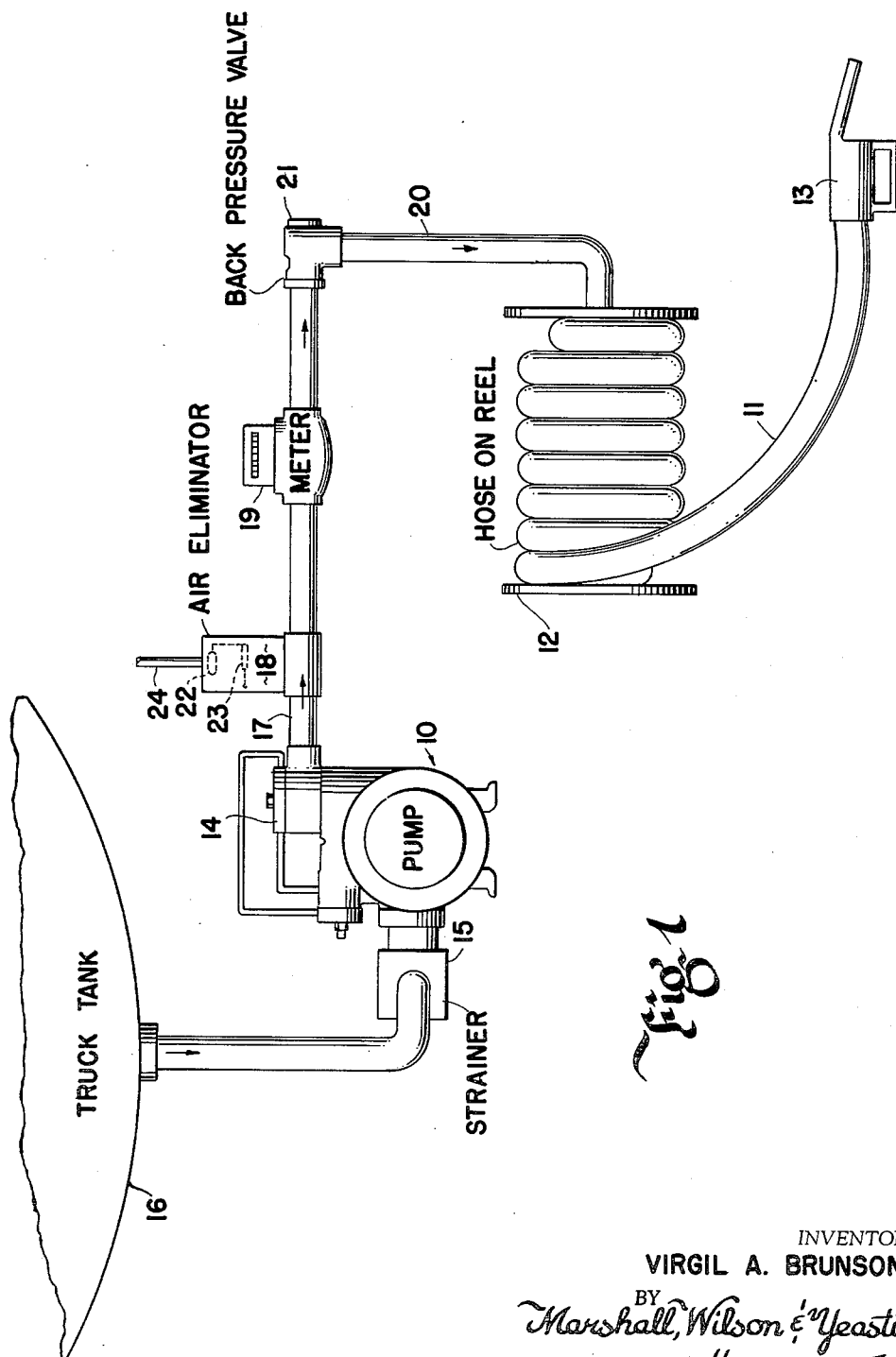

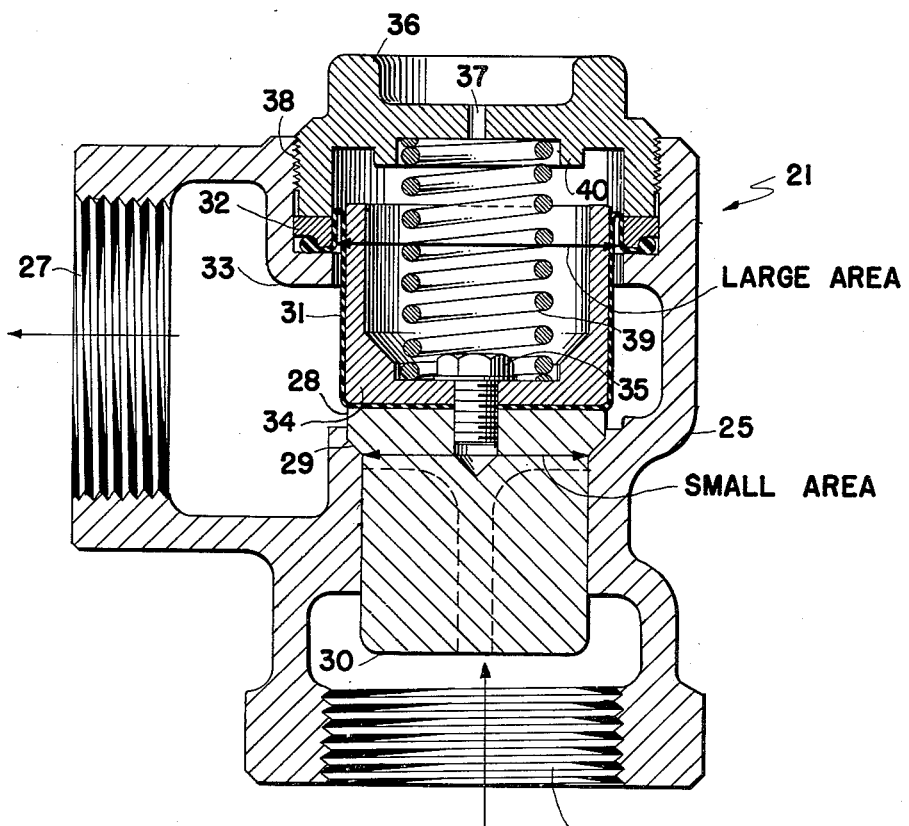

United States Patent Office 3,197,069
Patented July 27, 1965

3,197,069
SYSTEM FOR DISPENSING LIQUID HAVING A METER, AN AIR ELIMINATOR, AND BACK PRESSURE VALVE
Virgil A. Brunson, Grand Rapids, Mich., assignor, by mesne assignments, to Dover Corporaiton, New York, N.Y., a corporation of Delaware
Filed Mar. 16, 1964, Ser. No. 351,946
4 Claims. (Cl. 222—72)

This invention relates to pumps and pump controls.

Positive displacement pumps have been used extensively for pumping liquids or fluids into confined spaces having ample storage capacity, such as tanks partially filled with air. However, the use of such pumps for pumping into systems having little or no storage capacity has not been completely satisfactory and has required relatively complicated systems. An example of such a system having little or no storage capacity is a fuel oil delivery truck pumping system in which it is desired to operate a pump at high pressures while the delivering nozzle is open and liquid is flowing fast through the system and to have a low bypass pressure in the pumping system when the nozzle is closed and fluid motion stops. A major difficulty when pumping into a closed system having little or no storage capacity is the difficulty in passing the "split compartment test" (Weights and Measures) when air is passing through the system. The "split compartment test" is a test on the ability of the system to stay within the permissible tolerance while handling air. The sealer of Weights and Measures permits only a small amount of error in meter readings. A standard air eliminator, which is supplied along with the meter, separates air from the fuel oil and discharges it to atmosphere at flow rates up to about 50 to 60 g.p.m. A standard back pressure valve also is commonly used downstream of the meter as an aid in discharging air from the air eliminator.

An example of such a standard back pressure valve is shown in U.S. application Serial No. 280,841 filed May 16, 1963, in the names of Virgil A. Brunson and Harold L. Vanden Hoek, now abandoned, as the spring loaded poppet type check valve 51 which is included in a fuel oil delivery truck pumping system immediately following the system's meter. Being spring loaded, such a check valve provides a back pressure to the meter and the air eliminator. Without the back pressure, after the truck tank is drained, air tends to run through the meter and the hose. The check valve provides a barrier for the flow of air forcing it to go through the vent tube in the air eliminator. Without the back pressure valve, after the truck tank is drained and liquid motion stops, there is no friction drop through the delivery hose and therefore no pressure whatever on the system. Large volumes of air then would be pumped toward the meter and the air eliminator and all of this large volume of air must escape through a rather small vent hole in the air eliminator and through some tubing, all of which has a flow resistance. Without the back pressure valve, the buildup of air pressure trying to get out of the air eliminator forces some of the air through the meter causing it to be registered on the meter dial.

The above prior back pressure valve and all back pressure valves now available commercially merely are spring loaded poppet valves which have very poor pressure characteristics. Such a valve might have a 15 pound cracking pressure, but the pressure drop through this valve becomes greater and greater as the flow increases and the spring is compressed farther and farther. In order to hold back 15 pounds pressure with no flow there could very well be 30 p.s.i. pressure drop across it at 80 to 90 g.p.m. flow rates. This high pressure drop at high flow rates serves no useful purpose and merely adds extra load on the pump and system. In order to pass the above "split compartment test," it has been found to be necessary to provide at least 25 p.s.i. back pressure at no flow. This 25 p.s.i. accomplishes two things: first, it provides a barrier for the air so as to force it out of the air eliminator and, second, when a mixture of air and fuel oil which appears as a thick foam passes through the meter, the 25 p.s.i. compresses the gas to a much smaller volume than if it were allowed to pass through at near atmospheric pressure, thereby reducing the meter error.

Accordingly, the objects of this invention are to improve pumping systems, to provide a fuel oil delivery truck pumping system with a back pressure valve having good pressure characteristics, to improve back pressure valves, and to provide a fuel oil delivery truck pumping system with means for maintaining the minimum back pressure required for the efficient evacuation of air at no flow rate, which means has a very low pressure drop across it at high flow rates.

One embodiment of this invention enabling the realization of these objects is a back pressure valve which is particularly well suited for use in a fuel oil delivery truck pumping system. The valve normally is wide open during pumping and provides a minimum pressure loss (about 5 p.s.i. with a flow of 80 to 90 g.p.m.) and closes to maintain the minimum back pressure required for the efficient evacuation of air (about 25 p.s.i.) at no flow rate. The valve includes a spring which tends to hold the valve closed and a diaphragm surrounding the spring. When the valve is closed, there are four separate forces acting on the diaphragm. From one side of this closed valve is the spring pressure plus atmospheric pressure acting in one direction and on the other side of the closed valve is the inlet pressure (valve closes whenever fuel oil stops flowing while the nozzle is open) plus the outlet pressure acting on the diaphragm. The pressure of the incoming fluid acts on a relatively small diameter. The ratio of the net area of the closed valve to the effective area of the diaphragm is such that when liquid flows through the valve and through the discharge hose, the friction loss in the hose builds up pressure on the diaphragm and holds the valve wide-open. The valve accomplishes the objective of having a high back pressure of about 25 p.s.i. at no flow rate and a pressure drop across the valve of only 5 p.s.i. with a flow of 80 to 90 g.p.m. This is accomplished by having incoming high pressure acting on a relatively small area and having the valve movement controlled by the outgoing pressure acting on a much greater area.

In accordance with the above, one feature of this invention resides in providing a fuel oil delivery truck pumping system with means for maintaining the minimum back pressure required for the efficient evacuation of air at no flow rate, which means has a very low pressure drop across it at high flow rates.

The above and other objects and features of this invention will be appreciated more fully from the following detailed description when read with reference to the accompanying drawings wherein:

FIG. 1 is a schematic diagram of an improved pumping system constructed according to the invention; and FIG. 2 is a vertical sectional view of the back pressure valve shown in FIG. 1.

Referring to the drawings, a fuel oil delivery truck pump system is shown in FIG. 1. When the truck driver arrives at a customer's house, before he gets out of the cab, he puts a pump 10 in gear and lets the truck motor run at idling speed. The pump 10 is shown and described in detail in U.S. application Serial No. 346,274, filed February 20, 1964, in the name of Virgil A. Brunson.

The pump 10 then will be bypassing at a low pressure setting as described in such pending application. The driver pulls a hose 11 from a reel 12 in the low pressure condition. It is preferred that there be a certain minimum pressure always present in the system so that the hose 11 will wind on the reel 12 in an extended condition. A completely flat hose, when wound on a reel, provides a restriction to the flow on the next usage if the entire hose is not removed from the reel. When the driver puts the hose's nozzle 13 in the customer's tank, he opens the nozzle. Flow of fuel oil through the system is sensed by means of a motion sensor 14 as described in the above copending application and a high regulated pump output pressure is built up and then maintained. When the delivery is complete, the driver closes the nozzle 13 and the no flow condition is sensed by the motion sensor 14 (pump 10 recirculates at low pressure). The inlet port of the pump 10 communicates through a strainer 15 with a truck fuel oil tank 16 and the outlet port of the motion sensor 14 (pilot valve) is attached to a pipe 17 which carries the fuel oil through an air eliminator 18 and a meter 19 to a pipe 20 communicating with the hose 11, there being a back pressure valve 21 of the invention joining the pipes 17 and 20 downstream from the meter 19.

The air eliminator 18 is provided with a float-operated valve which is mechanically connected to a float 23. At the start, the valve 22 is open exhausting any air under pressure through a vent pipe 24 to the atmosphere. When the fuel oil is pumped through the pipe 17, it rises in the air eliminator 18 and air bubbles on top of the oil break and the air is exhausted to the atmosphere. Eventually, the oil rises to a point where it lifts the float 23 closing the valve 22. Air-free oil then flows into the meter 19. To assist in blowing air through the air eliminator 18, the back pressure valve 21 is included in the system immediately following the meter 19. The back pressure valve 21 provides a back pressure to the meter 19 and the air eliminator 18 which assists in blowing air through the air eliminator vent 24. Without the back pressure, after the tank 16 is drained, air tends to run through the meter and the hose. The back pressure valve 21 provides a barrier for the flow of air forcing it to go though the vent tube 24. The minimum back pressure required for the efficient evacuation of the air has been found to be about 25 p.s.i. at no flow. This 25 p.s.i. accomplishes two things: first, it provides a barrier for the air so as to force it out of the air eliminator and, second, when a mixture of air and fuel oil which appears as a thick foam passes through the meter, the 25 p.s.i. compresses the gas to a much smaller volume than if it were allowed to pass through at near atmospheric pressure, thereby reducing the meter error. Prior back pressure valves have very poor pressure characteristics. In order to hold back even 15 pounds back pressure with no flow there could very well be 30 p.s.i. pressure drop across a prior back pressure valve at 80 to 90 g.p.m. flow rate. This high pressure drop at high flow rates serves no useful purpose and merely adds extra load on the pump and system.

The back pressure valve 21 which is constructed according to the invention includes a body 25, having an internally threaded inlet 26 for the reception of a threaded end of the pipe 17 and an internally threaded outlet 27 for the reception of a threaded end of the pipe 20, and a disk valve 28 which controls the flow through the valve body 25. The disk valve 28 seats at 29 and is carried on a valve guide 30 that is axially slidable in the inlet 26. A flexible diaphragm 31 (rubberized cloth), which, like a piston, is a pressure responsive member, is clamped between a marginal face of a retaining ring 32 and a rim 33 which is formed as an integral part of the valve body 25. The diaphragm is held in its cup-shape shown in FIG. 2 by means of a retainer 34 the bottom of which clamps the bottom of the diaphragm 31 to the disk valve 28, there being a screw 35 which passes through a hole in the retainer 34 and which is screwed into a tapped hole in the disk valve 28 holding the retainer 34, the diaphragm 31 and the disk valve 28 together. A cover 36, having a vent hole 37 and external threads, is screwed into an internally threaded opening 38 in the valve body 25 and forces the retaining ring 32 against the ring-like edge of the diaphragm 31 as shown in FIG. 2. This securely clamps the diaphragm in place. The cover 36 also compresses a coil spring 39 between it and the bottom of the cup-shaped retainer 34, an integrally formed ring 40 on the inside of the cover 36 locating the spring 39 centrally in the valve body opening 38 during assembly. The vent hole 37 connects the body opening 38 to the atmosphere and the spring 39 urges the valve toward its closed position, the diaphragm 31 surrounding the spring 39 as shown in FIG. 2.

When the valve is closed, there are four separate forces acting on the diaphragm. From one side of the closed valve is the pressure of the spring 39 plus atmospheric pressure from the vent hole 37 acting in one direction and on the other side of the closed valve is the inlet pressure (vertical arrow in FIG. 2—valve closes whenever fuel oil stops flowing while the nozzle is open) plus the outlet pressure acting on the diaphragm 31. The pressure of the incoming fluid acts on a relatively small diameter as indicated by the double-ended arrow labeled "Small Area" in FIG. 2. The net area of the closed valve to the effective area of the diaphragm is such that when liquid flows through the valve and through the hose 11, the friction loss in the hose builds up pressure on the diaphragm and holds the valve wide-open (effective area of the diaphragm is indicated by the double-ended arrow labeled "Large Area" in FIG. 2). The valve accomplishes the objective of having a high back pressure of about 25 p.s.i. at no flow rate and a pressure drop across the valve of only 5 p.s.i. with a flow of 80 to 90 g.p.m. This is accomplished by having incoming high pressure acting on a relatively small area (short double-ended arrow) and having the valve movement controlled by the outgoing pressure acting on a much greater area (long double-ended arrow). Normally during pumping, the valve is wide open; it closes to maintain the minimum back pressure required for the efficient evacuation of air at no flow rate (closes, whenever the liquid stops flowing while the nozzle 13 is open).

In operation, at the start, the back pressure valve 21 is closed. When the pump 10 is started and the nozzle 13 is closed, provided there is liquid in the truck tank 16, pressure builds up immediately and the back pressure valve 21 opens. When the nozzle 13 is opened, the back pressure valve 21 stays open (very low pressure drop across valve 21 at high flow rates). If the truck tank 16 runs out of oil, the flow rate through the nozzle 13 diminishes, thus diminishing the back pressure to the valve 21 and the valve 21 tends to close to provide the minimum back pressure to the air eliminator required for the efficient evacuation of air at no flow rate. The principal feature of the back pressure valve resides in maintaining such minimum back pressure required for the efficient evacuation of air at no flow rate and yet providing a very low pressure drop across the valve at high flow rates, i.e., the new valve 21 has excellent pressure characteristics for pumping systems of the type shown in FIG. 2.

It is to be understood that the above description is illustrative of this invention and that various modifications thereof can be utilized without departing from its spirit and scope.

Having described the invention, I claim:

1. A system for dispensing a liquid comprising, in combination, a pump, a line leading from the outlet side of the pump which contains, in succession, (a) an air eliminator, (b) a meter, (c) a back pressure valve and (d) a manually operable dispensing valve, first means actuated by the pressure on the downstream side of the back pressure valve for biasing the valve toward open position, and second means for biasing the back pressure valve toward closed position with a predetermined biasing force which is sufficient to overcome the reduced force exerted by the first means and to close the valve in the event that, when the dispensing valve is open, the pump begins to suck air and causes air to be exhausted through the air eliminator, thereby reducing the flow of liquid so as to reduce the pressure drop in the line between the back pressure valve and the open dispensing valve.

2. A system as claimed in claim 1 wherein the first means is a diaphragm which is connected to the back pressure valve and which is exposed to the pressure on the downstream side of the valve to cause such pressure to bias the valve toward open position.

3. A system for dispensing a liquid comprising, in combination, a pump, a line leading from the outlet side of the pump which contains, in succession, (a) an air eliminator, (b) a meter, (c) a back pressure valve which has its seat on the downstream side and tends to open under the force exerted by the pressure on the upstream side of the valve and (d) a manually operable dispensing valve, first means actuated by the pressure on the downstream side of the back pressure valve for applying to the valve an additional biasing force tending to open the valve, and second means for biasing the back pressure valve toward closed position with a predetermined biasing force which is sufficient to overcome the reduced force exerted by the first means and to close the valve in the event that, when the dispensing valve is open, the pump begins to suck air and causes air to be exhausted through the air eliminator, thereby reducing the flow of liquid so as to reduce the pressure drop in the line between the back pressure valve and the open dispensing valve.

4. A system as claimed in claim 3 wherein the first means is a diaphragm which is connected to the back pressure valve and which is exposed to the pressure on the downstream side of the valve to cause such pressure to bias the valve toward open position.

References Cited by the Examiner

UNITED STATES PATENTS

| | | | |
|---|---|---|---|
| 2,043,035 | 6/36 | De Lancey | 222—73 |
| 2,049,239 | 7/36 | Wilcox | 222—52 |
| 2,186,069 | 1/40 | Hazard | 222—72 X |
| 2,499,527 | 3/50 | Raymond | 137—494 |
| 2,931,378 | 4/60 | Davies | 137—494 X |

M. HENSON WOOD, Jr., *Primary Examiner.*

RAPHAEL M. LUPO, *Examiner.*